Oct. 12, 1937.  O. L. STARR ET AL  2,095,559
TRACTOR
Filed Nov. 28, 1933  3 Sheets-Sheet 1
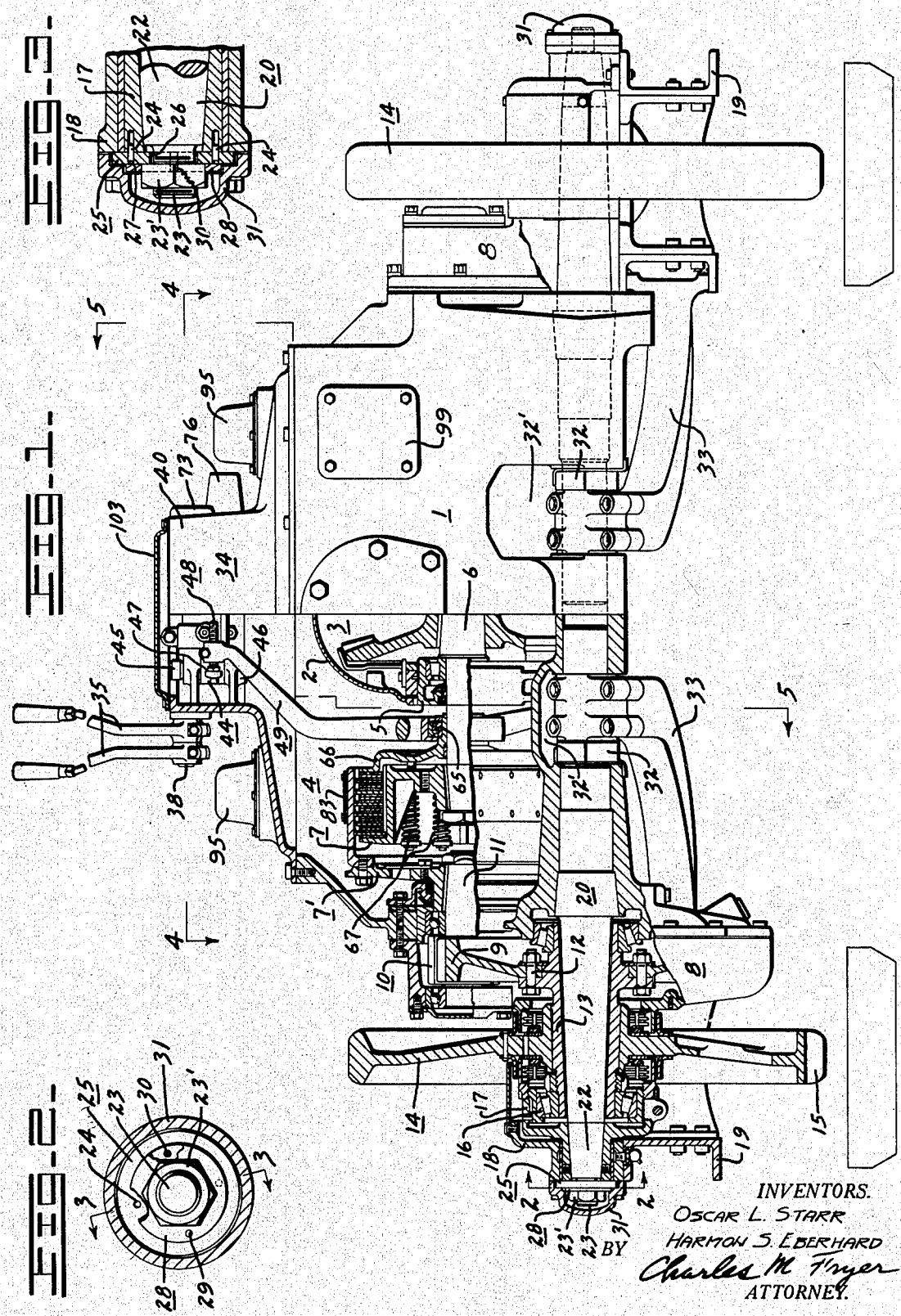
INVENTORS.
Oscar L. Starr
Harmon S. Eberhard
BY Charles M. Fryer
ATTORNEY.

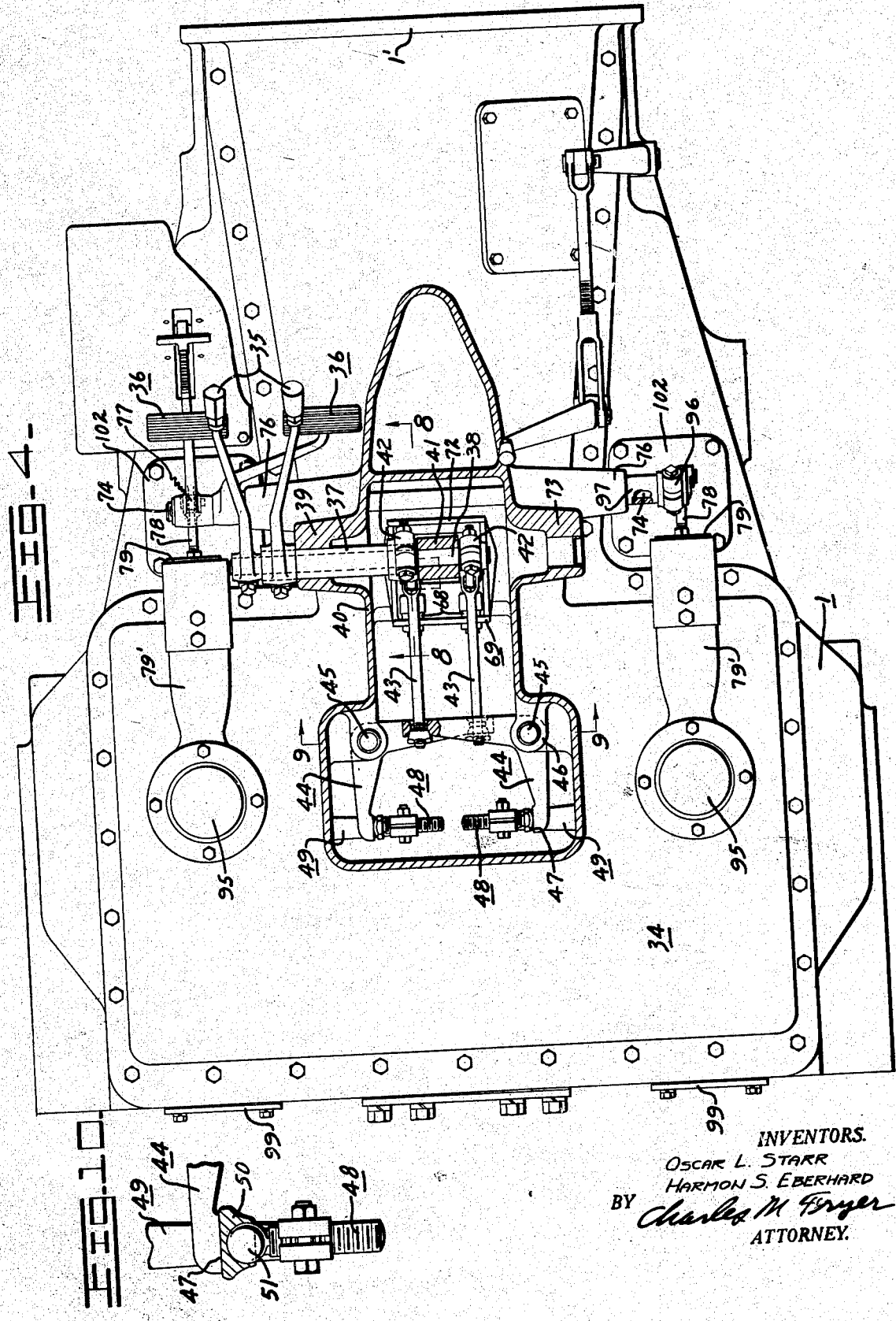

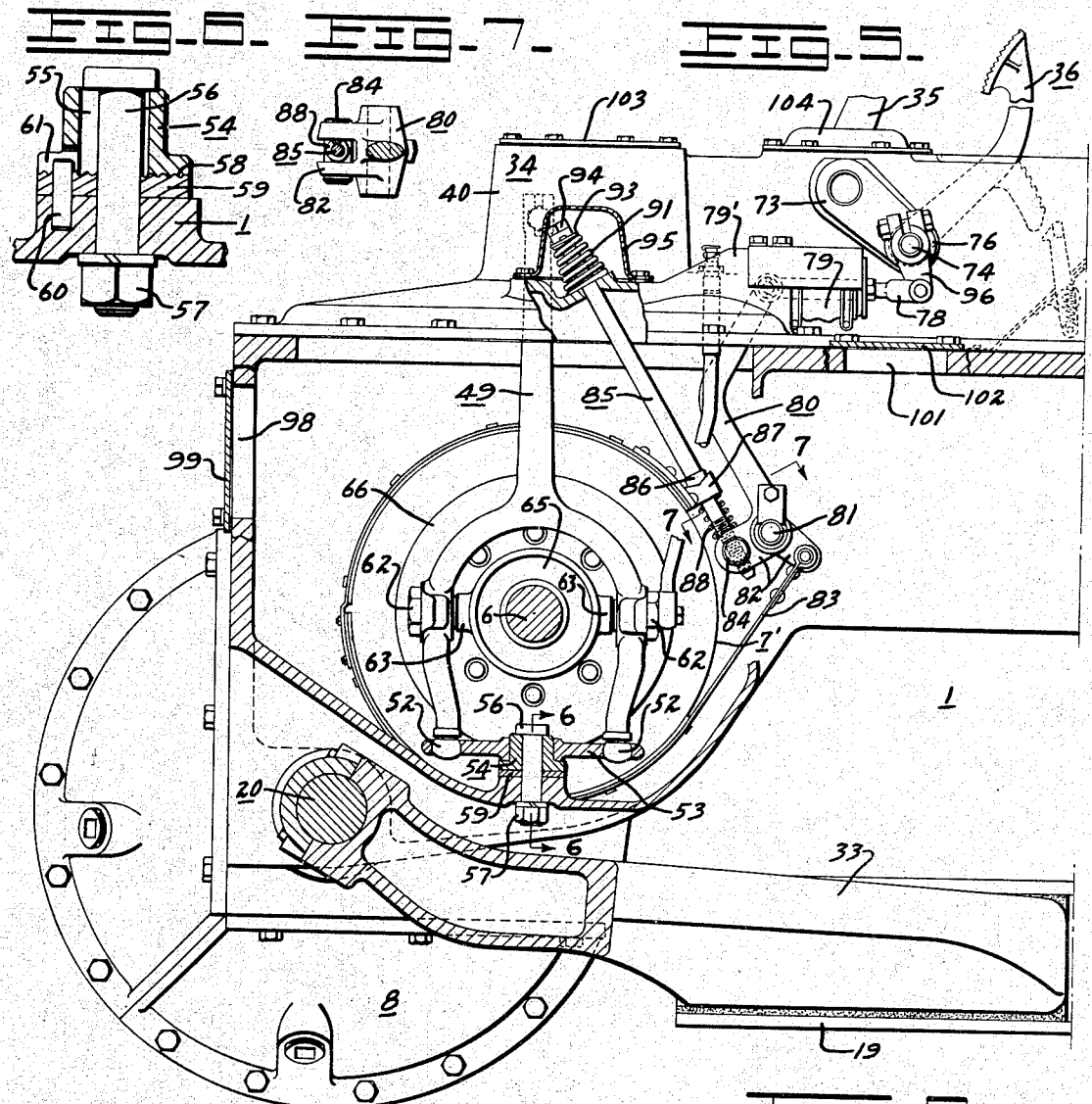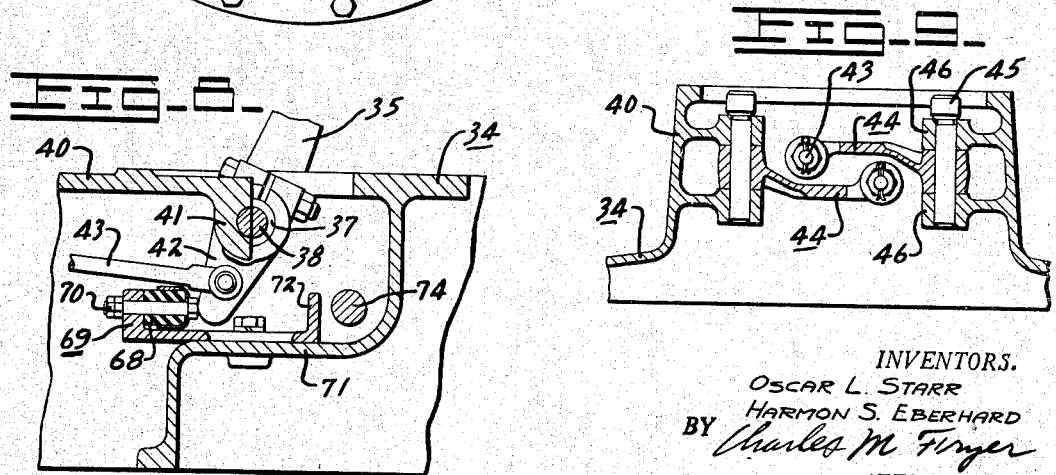

Patented Oct. 12, 1937

2,095,559

UNITED STATES PATENT OFFICE 2,095,559

TRACTOR

Oscar L. Starr, Mission San Jose, Calif., and Harmon S. Eberhard, Peoria, Ill., assignors to Caterpillar Tractor Co., San Leandro Calif., a corporation of California Application November 28, 1933, Serial No. 700,066

17 Claims. (Cl. 180—9.2)

Statement and objects of invention

This invention relates to a track-type tractor having self-laying track mechanism on which the tractor as a whole is propelled and by which it is steered. More particularly, the invention relates to adjusting means for the steering and braking elements of said track mechanisms.

An object of the invention is to provide means whereby brake bands of track mechanism brakes can be readily adjusted, and assembled or disassembled.

Another object of the invention is to provide adjustable mountings for the steering clutch throw-out members, employed in connection with the track mechanisms.

Another object of the invention is to provide improved actuating means for the steering clutch throw-out members.

Another object of the invention is to provide steering controls for the track mechanisms, which can be readily assembled to form either a right-hand or a left-hand drive.

A further object of the invention is to provide a transmission case structure wherein openings through the walls thereof are so positioned, that access to certain parts of the mechanism in said case can be readily had, to facilitate assembly, disassembly, and adjustment of said parts; said openings being normally closed.

Other objects of our invention will appear as the description progresses.

Introduction

This invention is generally applicable to a track-type tractor which comprises a combined motor and transmission unit forming the main frame of the tractor. The main frame is supported upon a pair of endless track mechanisms on which the tractor is propelled and by which it is steered.

In operation, power is delivered by the motor, through the usual change speed gears, to a power distributing shaft which has mounted thereon, at each end thereof, the driving member of a multiple plate, spring loaded, steering clutch. Power is next transmitted to the driven members of said clutches, through the final drive gears, and to the track drive sprockets which are located one on each side of the transmission unit and are adapted to lay the tracks.

When the tractor is being driven straight ahead and it is desired to steer it to either the right or the left, the steering clutch on the desired side is released. This interrupts the power flow to the selected track drive sprocket, and turning of the tractor is, hence, effected.

The driven members of the two steering clutches are made in the form of drum-like structures; the outer surfaces thereof being, hence, adapted to act as normally revolving brake drums. To facilitate the steering, brake bands are arranged in operative relation with each of said drums. The brake bands are independently connected to levers by which they may be independently operated to assist in steering the tractor when the associated steering clutch has been released.

Description of figures

Reference will now be made to the drawings for a description of the preferred embodiment of our invention.

Fig. 1 is a partial transverse sectional, rear elevation of the transmission unit part of the tractor main frame.

Fig. 2 is a sectional end view taken in a plane indicated by line 2—2 of Fig. 1.

Fig. 3 is a fragmentary longitudinal sectional view taken in a plane indicated by line 3—3 of Fig. 2.

Fig. 4 is a partial sectional plan view of the transmission unit illustrated in Fig. 1; the sectionalized portion of the figure is taken in a plane indicated by line 4—4 of Fig. 1.

Fig. 5 is a partial sectional elevation of the rear portion of the transmission unit, taken in planes indicated by line 5—5 of Fig. 1.

Fig. 6 is a vertical sectional view taken in a plane indicated by line 6—6 of Fig. 5.

Fig. 7 is a sectional view taken in a plane indicated by line 7—7 of Fig. 5.

Fig. 8 is a sectional view taken in a plane indicated by line 8—8 of Fig. 4.

Fig. 9 is a sectional view taken in a plane indicated by line 9—9 of Fig. 4.

Fig. 10 is a fragmentary sectional view of a modified type of actuating rod connection with the upper end of each of the steering clutch throw-out members.

Description of mechanism

In Fig. 1, the left-hand side of the transmission case is shown in section. Inasmuch as the mechanism enclosed in the right side is a duplicate of that enclosed in the left-hand side, only the sectionalized portion of the figure will be identified.

The transmission case 1 (Fig. 4), which form part of the tractor main frame, is generally T-shaped in plan view and has a flange 1' at its forward end adapted to be detachably but rigidly secured to a companion flange of a motor (not shown). The motor, thus, provides another part of the tractor main frame. Case 1 is normally open at the top which is adapted to be closed by a cover. Inside thereof, the case 1 is formed with partition wall 2 (Fig. 1) to form a central oil compartment 3, in which the change speed gears and driving shafts of the transmission are located. At the rear portion of case 1 and at each side of the oil compartment 3, is formed a dry steering clutch pocket 4.

Journaled in longitudinally extending walls 5 is a cross shaft 6 driven from the transmission. Each end of cross shaft 6 extends into a dry pocket, and has secured for rotation therewith driving part 7 of a multiple disc steering clutch.

On each side of the rear portion of case 1 is detachably secured a final drive gear housing 8, which encloses gear 9 and driving pinion 10; pinion 10 being secured for rotation with shaft extension 11, upon which is secured the driven part 7' of the steering clutch. Shaft 11 is journaled at its outer end in the outer wall of housing 8, and at its approximate center in a side wall of case 1. Gear 9 is in mesh with pinion 10 and is secured by bolts 12 to quill 13, on the outer end of which quill is mounted the final drive sprocket 14 which has teeth 15 on the periphery thereof to engage the endless track. Quill 13 is journaled at its inner end in the outer wall of case 1, and at its outer end in bearing 16 which is, in turn, mounted in cage member 17. Cage member 17 provides a journal for the pivotal mounting of bracket 18 secured to the outer side of the rear end of truck or track roller frame 19. Thus, the truck frame 19 can oscillate about the final drive sprocket axis. A non-rotatable stub axle 20 is rigidly but removably secured in the lower rear portion of case 1, and extends outwardly through and beyond the outer end of quill 13. Cage member 17, previously referred to, is mounted on stub axle 20 which is free of contact with quill 13. Referring to Fig. 3, it will be seen that stub axle 20 has an outer tapered portion 22, and a threaded portion 23, which is adapted to receive the threaded nut 23' thereon. Bearing cage member 17 (Figs. 1 and 3) has a tapered central bore which permits said member to be slid into position onto the tapered portion 22 of shaft 20, with its outer end projecting slightly beyond the outer end of tapered portion 22. A plurality of axially displaced holes are formed in the outer edge of cage member 17, in which holes dowel pins 24 are press fitted. The outer ends of dowel pins 24 project far enough to enable a pressure plate 25, having a central bore 26 therethrough and also a plurality of spaced dowel receiving holes 27 therein, to be mounted in position around said threaded portion with the dowels 24 in holes 27.

With plate 25 in position, nut 23' can be screwed upon the threaded portion 23 of stub axle 20, to force member 17 thereon tightly against taper 22 of stub axle 20. The mechanism just described aids in locking cage member 17 to stub axle 20. Nut 23' is locked on the threaded portion 23 of stub axle 20, by a circular disc 28 having a sized central opening therein, the configuration of which corresponds to that of the head of nut 23'. Two or more axially spaced holes 29 in disc 28 are adapted to fit over another set of dowel pins 30 fitted in plate 25. Dowels 30 hold disc 28 against rotation with respect to pressure plate 25. Thus, nut 23' is securely locked against rotation on the threaded portion 23 of stub axle 20; and since disc 28 is held against rotation, cage member 17 is fixedly held on stub axle 20.

To prevent dirt and foreign matter from entering the zone of nut 23', we employ a dust cap 31 which encloses nut 23' and is secured to the outer end of member 18, by suitable fastening means.

The contour of stub axle 20 (Fig. 1) is generally tapered or stepped from its proximate longitudinal center in either direction to its ends; and on the inner end portion of stub axle 20 is threaded lock nut 32 which seats in a recess 32' in the underside of case 1 and holds the stub axle rigidly against rotation in the case. An arcuate brace 33 having its outer end welded to truck frame 19 and its inner end journaled on the portion of stub axle 20 in recess 32', holds the truck frame against lateral movement.

The track steering controls will now be described. A transmission case cover 34 (Figs. 1 and 4) is provided for the top opening in case 1. The cover forms a mounting for steering clutch levers 35 and for clutch brake actuating foot pedals 36. Preferably, the steering clutch control levers 35 and the steering clutch foot pedals 36 are assembled on the left side of cover 34, immediately in front of the operator's seat (not shown) to form a left-hand drive.

Levers 35 are each secured to one of independent rock shafts 37 and 38, which are telescoped one within another. Outer shaft 37 is journaled in lateral boss 39 on an upstanding portion 40 of cover 34; and inner shaft 38 is journaled in outer shaft 37 at its outer portion, and at its inner end in journal 41 on upstanding part 40 of cover 34.

On the inner end of inner shaft 38, is mounted depending lever 42 (Figs. 4 and 8), to which a reach rod 43 is pivotally attached. Reach rod 43 extends rearwardly and is universally connected to a compound bell-crank 44 (Figs. 4 and 9) which is journaled on vertical pivot pin 45, secured in bosses 46 formed integrally with upstanding portion 40 of cover 34. The end of the rearwardly extending arm of the compound bell-crank 44 is formed with a longitudinally extending flat 47 (Figs. 1 and 4) adapted to contact an end of threaded member 48 which is adjustably mounted in the upper end of clutch throw-out lever 49.

In Fig. 10 is illustrated a modified construction of the contact means between bell-crank 44 and the clutch throw-out lever 49, which construction is designed to reduce wear to a minimum. Large flat surface 47 on bell-crank 44 is adapted to contact a complementary large flat surface on member 50 universally mounted on ball 51 integral with threaded member 48. Because of the universal mounting of member 50 and the large flat bearing surfaces, contact between bell-crank 44 and member 50 is insured over a large area regardless of the angular position of bell-crank 44.

Clutch throw-out lever 49 (Figs. 5 and 6) is made in the form of an inverted Y, the lower ends of which terminate in ball members 52 which are universally mounted for pivotal movement in sockets formed in the ends of bar 53 journaled on boss 54. Boss 54 has an elongated transversely extending slot 55 therein, through which extends pin 56 which is secured by nut 57 at the underside of case 1. Thus, boss 54 provides a transversely adjustable mounting for proper pivotal positioning of the throw-out lever 49; and because of the journal for lever 53, the clutch throw-out movement is always equalized. For holding the boss 54 in adjusted position, its lower end is serrated longitudinally at 58 (Fig. 6) to engage complementary serrations on plate 59 secured to the case 1 by dowel pin 60; the dowel pin 60 extending through transverse recess 61 at the lower end of boss 54, so as to guide the movement of the boss when adjustment thereof is desired. When it is desired to shift the pivotal anchorage of clutch throw-out yoke 49 transversely of the tractor to compensate for natural wear in its associated steering clutch, nut 57 can be readily loosened, thus permitting equalizer bar or lever 53 to be shifted to the desired position. Upon tightening of the nut 57, the boss 54 is fixedly held against transverse movement by the longitudinal serrations on the boss and the plate 59.

Shifting of clutch throw-out lever 49 is employed for effecting engagement and disengagement of the associated steering clutch. For this purpose, the forked portions of the throw-out lever have opposed studs 62 (Fig. 5) secured thereto on a horizontal axis. Studs 62 engage ears 63 formed on axially slidable bearing 65 journaled about a hub of (Fig. 1) axially slidable, spring held pressure plate 66 for effecting, normally, engagement of the usual interengaging multiple clutch discs on the clutch parts 7 and 7'.

Thus far, we have described the steering control connections for one of the tracks of the tractor, from one of clutch levers 35. The steering control connection for the other track is the same as that previously described, and is obtained by operating the other lever 35 mounted on outer shaft 37, upon the inner end of which is secured another depending lever 42 corresponding to the depending lever 42 on inner shaft 38. Since it is desirable that the right-hand control lever control the right-hand track mechanism, and the left-hand control lever control the left-hand track mechanism, provision is made for overlapping the linkage connections between telescoping shafts 37 and 38 and the releasable connections or steering clutches for the respective track mechanisms. This arrangement permits the employment of the telescopic shafts 37 and 38 and thereby enables the interchangeability of the clutch control levers as will be pointed out hereinafter.

In operation of tractors of the type herein disclosed, when extreme accuracy in steering is required, the operator usually disengages or partially disengages one or the other of the steering clutches, by a slight rearward pull on the desired clutch control lever 35. Then, the operator usually quickly removes his hand from such lever to allow the clutch to spring into instantaneous engagement by the action of a series of compression springs 67 used in the construction of clutches of the character herein disclosed. When the above method of operation is resorted to, it has been found desirable to provide for each steering clutch control a shock absorbing bumper, such as shown in Fig. 8, which comprises a resilient rubber block 68, which is secured to base 69 by suitable means, such as bolt and nut means 70. Base 69 is secured in desired position to rib 71 formed integrally on cover 34. An upturned flange 72 is formed on base 69 to provide an abutment against which the lower end of bell-crank 42 may rest when the steering clutch is disengaged its maximum amount. Thus, by virtue of the bumper 68 and flange 72, the limits of travel of bell-crank 42 are fixed in either direction.

Both clutch levers 35, as was previously described, are shown mounted at the left of the tractor for a left-hand control. In some classes of work, it is desirable that the operator be positioned on the right-hand side of the tractor. For this purpose, we provide a construction which enables ready interchangeability of the clutch controls for either left- or right-hand operation.

Cover 34 (Fig. 4) and the upstanding portion 40 thereof are symmetrically arranged with respect to the longitudinal axis. A lateral right-hand hollow boss 73 is disposed symmetrically with respect to boss 39. Boss 73 is adapted to provide a mounting for the telescoping shafts 37 and 38, which, when it is desired to provide the right-hand control, can be disconnected from depending levers 42, reversed 180° and then be reconnected to levers 42, after being mounted in boss 73. In this connection, it will be noted that the inner portions of bell-cranks 44 overlap, and that the left-hand reach rod 43 operates the right steering clutch and the right-hand reach rod 43 the left clutch. In the left control position, inner rock shaft 38, which provides a mounting for the left control lever 35, is connected to right-hand reach rod 43. When the shafts 37 and 38 are mounted in right-hand boss 73, inner shaft 38, which will then provide a mounting for the right-hand lever 35, will be connected to left-hand reach rod 43. Thus, control levers 35 will be properly positioned for either control location thereof.

The clutch brake pedals 36 are both, preferably, mounted at the left of the tractor for left-hand control; and are adapted for repositioning to provide for the right-hand control when the clutch control levers 35 are at the right of the tractor. Left-hand brake pedal 36 (Fig. 4) is freely journaled on the left-hand end of cross shaft 74 journaled in lateral symmetrically disposed bosses 76 formed integral with upstanding portion 40 of cover 34; and the right brake pedal is secured to shaft 74 in a space between the left brake pedal and left boss 76. The left-foot pedal 36 (Fig. 4) is in the form of a compound bell-crank having one long arm and one short arm. Short arm 77 has a reach rod 78 pivotally connected thereto. Reach rod 78 is disposed at the side of upstanding cover portion 40 and extends through seal 79, into lateral upstanding hood portion 79' formed at the side of cover 34. In hood portion 79', reach rod 78 (Fig. 5) is pivotally connected to bell-crank brake lever 80, journaled on pin 81 secured in case 1. The lower end of lever 80 is formed with divergent arms 82; each arm 82 being connected to an end of brake band 83 which is adapted to engage frictionally the driven clutch part 7'. Actuation of the brake pedal downwardly results in drawing the ends of brake band 83 together to lock driven clutch part 7', thereby facilitating sharp steering.

Rear arm 82 (Figs. 5 and 7) is forked and has pin 84 journaled therein; pin 84 being formed with a transverse threaded aperture in which is screwed the lower end of an adjusting rod 85. Adjusting rod 85 engages an end of brake band 83 by the usual cam part 86 on the rod, adapted to interlock with tubular cam part 87 on the brake band; a spring 88 being interposed between cam part 87 and pin 84 to hold cam parts 86 and 87 together. The upper end portion of adjusting rod 85 extends through a sized hole in cover 34 and has thereabout helical compression spring 91. Lower end of spring 91 abuts the top of cover 34; and the upper end of the spring abuts a washer 93 pressed against a cotter pin mounted in an enlarged head 94 on the top of rod 85. A removable dust cap 95 is detachably secured to cover 34, over spring 91.

Compression spring 91 exerts a constantly acting upward force upon adjusting rod 85; and by virtue of its linkage connection to foot pedal 36, the foot pedal is normally held in inactive position so that the brake band 83 will normally be free of contact with the brake drum formed on clutch part 7'.

The brake actuating linkage for the right-hand steering clutch (Fig. 4) is the same as that for the left-hand steering clutch; the right-hand pedal 36, as previously stated, being secured to shaft 74 extending through the lateral bosses 76. Shaft 74 (Fig. 4) extends beyond right lateral boss 76 and is pivotally connected to right-hand reach rod 78 by lever 96 secured to the right end of shaft 74; a tubular spacer 97 being positioned between right boss 76 and lever 96. Should it be desired to provide for a right-hand positioning of the brakes, this can be readily done, by reversing shaft 74, mounting lever 96 at the left end of the shaft, journaling the left pedal 36 in Fig. 4 on the right end of the shaft, and employing a different left pedal 36 with its arm extending to the left instead of to the right as shown in Fig. 4.

From the preceding description, it will be apparent that we have provided an arrangement whereby the track steering controls can be readily adjusted, and whereby a right or left-hand drive can be readily obtained. Both steering clutches can be quickly adjusted to compensate for wear, merely by loosening the nuts 57 at the under side of case 1 and shifting bosses 54 laterally to the desired position. When it is desired to adjust the tension in brake bands 83, this can be done conveniently by removing covers 95, and adjusting rods 85. To facilitate access to the steering clutches and brakes, the rear end of transmission case 1 (Fig. 5) is provided with side apertures 98 normally closed by covers 99, and the top of the case is provided with side top apertures 101 normally closed by covers 102. Upstanding portion 40, which houses the bell-crank 44 mechanism, is provided with a removable cover 103, so that threaded members 48 can be readily adjusted, and also with a cover 104 to permit access to reach rods 43 and levers 42.

We, therefore, claim as our invention:

1. In a track-type tractor, a tractor frame, a track mechanism at each side of said frame of the type adapted to be separately driven for steering of the tractor, steering controls for the track mechanisms including a releasable drive interrupting control member and a brake control member for each track mechanism, and steering control mounting means for said members at each side of the tractor adapting said tractor for positioning of said steering controls at either side thereof.

2. In a track-type tractor, a tractor frame, a track mechanism at each side of said frame, means for transmitting a drive to each track mechanism including a releasable connection for each track mechanism, a control member for effecting release of each releasable connection, means for mounting both of the control members adjacent one side of the tractor, and additional mounting means adjacent the other side of said tractor for said control members.

3. In a track-type tractor, a tractor frame, a track mechanism at each side of said frame, means for transmitting a drive to each track mechanism including a releasable connection for each track mechanism, a control member for effecting release of each releasable connection, a braking device for each releasable connection, a control member for each braking device, means for mounting both of the releasable connection control members adjacent one side of the tractor, means for mounting both of the braking device control members adjacent said one side of the tractor, and additional mounting means adjacent the other side of said tractor for said control members.

4. In a track-type tractor, a frame having a track mechanism at each side thereof, means for transmitting a drive to each track mechanism including a releasable connection for each track mechanism, a control member for each releasable connection, the left-hand control member controlling the left-hand track mechanism, and the right-hand control member controlling the right-hand track mechanism, an actuating connection between each control member and the releasable connection associated therewith; the actuating connections including a pair of pivotally mounted members having overlapping end portions, a pair of rod members, each of said rod members being connected to an overlapping end portion, and a pair of telescoped shafts, each shaft being connected to a rod member and to one of said control members.

5. In a track-type tractor, a frame having a track mechanism at each side thereof, means for transmitting a drive to each track mechanism including a releasable connection for each track mechanism, a control member for each releasable connection, an actuating connection between each control member and the releasable connection associated therewith; the actuating connections including a pair of pivotally mounted members having overlapping end portions, a pair of substantially parallel rod members, each of said rod members being connected to an overlapping end portion, a pair of telescoped shafts, each shaft being connected to a rod member; mounting means adjacent one side of said tractor for both of said shafts in telescoped relationship, and optional mounting means adjacent the opposite side of said tractor for both of said shafts; the pivotally mounted members, the rod members and the mounting means being arranged substantially symmetrically with respect to a longitudinal line of said tractor.

6. In a track-type tractor, a case, a track mechanism at each side of said case, means for transmitting a drive to each track mechanism including a releasable connection for each track mechanism and mounted within said case, an adjustable braking device for each releasable connection and mounted within said case, means for effecting adjustment of each braking device including a member projecting through a wall of said case for manipulation outside of said wall, and resilient means outside of said wall interposed between said wall and abutment means on said member.

7. In a track-type tractor, a case, a track mechanism at each side of said case, means for transmitting a drive to each track mechanism including an adjustable releasable connection for each track mechanism and mounted within said case, an adjustable braking device for each releasable connection and mounted within said case, means for effecting adjustment of each braking device including a member projecting through a wall of said case for manipulation outside of said wall, and means for effecting adjustment of each releasable connection including another member projecting through a wall of said case for manipulation outside of said wall.

8. In a track-type tractor, a case, a track mechanism at each side of said case, means for transmitting a drive to each track mechanism including an adjustable releasable connection for each track mechanism and mounted within said case, an adjustable braking device for each releasable connection and mounted within said case, means for effecting adjustment of each braking device including a member projecting through the top wall of said case for manipulation outside of said wall, and means for effecting adjustment of each releasable connection including another member projecting through the bottom wall of said case for manipulation outside of said bottom wall.

9. In a track-type tractor, a case, a track mechanism at each side of said case, means for transmitting a drive to each track mechanism including an adjustable releasable connection for each track mechanism and mounted within said case, an adjustable braking device for each releasable connection and mounted within said case, means for effecting adjustment of each braking device including a member projecting through a wall of said case for manipulation outside of said wall, and means for effecting adjustment of each releasable connection including another member projecting through a wall of said case for manipulation outside of said wall, said case having normally covered apertures for each releasable connection and the associated braking device to allow access to each releasable connection and its braking device.

10. In a track-type tractor, a case, a track mechanism at a side of said case, a drive for said track mechanism including a releasable connection, means for effecting release of said releasable connection including a forked member, a bar to which the prongs of said forked member are movably connected, and a bar supporting member adjustably mounted in said case and upon which the bar is journaled.

11. In a track-type tractor, a case, a track mechanism at a side of said case, a drive for said track mechanism including a releasable connection, means for effecting release of said releasable connection including a forked member, a bar to which the prongs of said forked member are movably connected, a bar supporting member upon which said bar is journaled, said bar supporting member having a slot, a pin of less size than said slot extending through said slot and through a wall of said case, and means outside said case for fixedly securing said pin.

12. In a track-type tractor, a case, a track mechanism at a side of said case, a drive for said track mechanism including a releasable connection, means for effecting release of said releasable connection including a forked member, a bar to which the prongs of said forked member are movably connected, a bar supporting member upon which said bar is journaled, said bar supporting member having a slot extending transversely with respect to the longitudinal axis of said tractor, a pin of less size than said slot extending through said slot and through a wall of said case, said bar supporting member having a plurality of longitudinally extending serrations adapted to interlock with complementary serrations on said case, a pin of less size than said slot extending through said slot and through a wall of said case, and means for fixedly securing said pin.

13. In a track-type tractor, a case including a cover having an upstanding housing portion, a cover for said housing portion, a track mechanism at each side of said case, means for transmitting a drive to each track mechanism including an adjustable releasable connection, an adjustable braking device for each releasable connection, actuating means for the releasable connections including linkage members mounted in said upstanding housing portion of said cover, means for adjusting each of said releasable connections including a member extending through the bottom of said case and accessible without said bottom, and means for adjusting each of said braking devices including a member extending through the cover of said case and accessible without said cover, the adjustable members for said braking devices being located at opposite sides of said upstanding housing portion, and actuating means for said braking devices including a linkage connection at each side of said upstanding housing portion and extending through sealed hooded portions on said cover.

14. In a track-type tractor, a track mechanism, driving means for said mechanism including a releasable connection, and means for effecting release of said connection, comprising a pivotally mounted bell-crank having a flat end portion, a movably mounted linkage member, an adjustable member on said movably mounted member, a cap having a flat surface engaging said flat end portion of said bell-crank, and means for universally mounting said cap to maintain said flat end portion and said flat surface in planar contact irrespective of the position of said bell-crank.

15. In a track-type tractor, a case, a track mechanism at a side of said case, a drive for said track mechanism including a releasable connection, means for effecting release of said connection including a forked member movably mounted within said case, and means for adjusting said forked member including a bar member to which the prongs of said forked member are movably connected, said bar member being supported on said case for adjustment relative to said case.

16. In a track-type tractor, a case, a track mechanism at a side of said case, a drive for said track mechanism including a releasable connection, means for effecting release of said connection including a forked member, means for adjusting said releasable connection including a bar member to which the prongs of said forked member are connected, said bar member being adjustably supported within said case, and means for securing said bar member to said case including a member accessible from outside the case.

17. In a track-type tractor, a tractor body having a track mechanism at the left side thereof and a track mechanism at the right side thereof, means for transmitting a drive to each track mechanism including a releasable connection for each track mechanism, control members at one side of said tractor body for controlling the operation of each of said releasable connections, an actuating connection between each control member and a releasable connection, and means included in said actuating connections for enabling a left-hand control member to operate the left track mechanism and a right-hand control member to operate the right track mechanism comprising telescoped shafts connected to said control members and overlapping linkage means.

OSCAR L. STARR.
HARMON S. EBERHARD.